(12) United States Patent
Deng et al.

(10) Patent No.: US 10,126,890 B2
(45) Date of Patent: Nov. 13, 2018

(54) SINGLE LAYER SENSOR PATTERN AND SENSING METHOD

(71) Applicant: SYNAPTICS INCORPORATED, San Jose, CA (US)

(72) Inventors: Qingbiao Deng, San Jose, CA (US); Ying Wang, Fremont, CA (US); Sang Chul Han, San Jose, CA (US); Yi-Fei Zhang, Shanghai (CN)

(73) Assignee: SYNAPTICS INCORPORATED, San Jose, CA (US)

( * ) Notice: Subject to any disclaimer, the term of this patent is extended or adjusted under 35 U.S.C. 154(b) by 356 days.

(21) Appl. No.: 14/997,772

(22) Filed: Jan. 18, 2016

(65) Prior Publication Data

US 2017/0192556 A1 Jul. 6, 2017

(30) Foreign Application Priority Data

Dec. 31, 2015 (CN) .......................... 2015 1 1030680

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 3/0418* (2013.01)

(58) Field of Classification Search
CPC .... G06F 3/0412; G06F 3/0416; G06F 3/0418; G06F 3/044; G06F 2203/04111
See application file for complete search history.

(56) References Cited

U.S. PATENT DOCUMENTS 4,087,625 A 5/1978 Dym et al.
4,233,522 A 11/1980 Grummer et al.
(Continued)

FOREIGN PATENT DOCUMENTS

CN 2436978 Y 6/2001
CN 1490713 A 4/2004
(Continued)

OTHER PUBLICATIONS

Tsz-Kin Ho et al. "32.3: Simple Single-Layer Multi-Touch Projected Capacitive Touch Panel", SID 2009 Digest, pp. 447-450.
(Continued)

*Primary Examiner* — Antonio Xavier
(74) *Attorney, Agent, or Firm* — Patterson + Sheridan, LLP (57) ABSTRACT

This disclosure generally provides an input device, electronic systems and processing system for touch sensing. In one example, an input device for touch sensing includes receiver electrodes and transmitter electrodes arranged in transmitter and receiver electrode columns. Each transmitter electrode within each transmitter electrode column is paired with two adjacent receiver electrodes of a first column of the receiver electrode columns. A first plurality of traces couple a first group of receiver electrodes in the first receiver electrode column, the first plurality of traces not passing between the transmitter and receiver electrodes of the first transmitter and receiver electrode columns. A second plurality of traces coupled a second group of receiver electrodes in the first receiver electrode column, the second plurality of traces passing between one of the transmitter electrodes of the first transmitter electrode column and one of the receiver electrodes of the second group of receiver electrodes.

11 Claims, 6 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 * | 6/2009 | Mackey ............... G01D 5/2415 324/660 |
| 7,554,531 B2 | 6/2009 | Baker et al. |
| 7,589,713 B2 * | 9/2009 | Sato ..................... G06F 3/0213 345/168 |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,259,078 B2 | 9/2012 | Hotelling et al. |
| 8,278,571 B2 * | 10/2012 | Orsley .................... G06F 3/044 178/18.03 |
| 8,319,747 B2 | 11/2012 | Hotelling et al. |
| 9,081,457 B2 | 7/2015 | Solven et al. |
| 9,857,828 B2 * | 1/2018 | Aubauer ................ G06F 1/16 |
| 2002/0077313 A1 | 6/2002 | Clayman |
| 2003/0052867 A1 | 3/2003 | Shigetaka et al. |
| 2003/0103043 A1 * | 6/2003 | Mulligan ............... G06F 3/044 345/174 |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0009551 A1 | 1/2009 | Takahashi |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |

(56) References Cited

U.S. PATENT DOCUMENTS

| | | | |
|---|---|---|---|
| 2009/0194344 A1* | 8/2009 | Harley | G06F 3/044 178/18.06 |
| 2009/0201267 A1 | 8/2009 | Akimoto et al. | |
| 2009/0207154 A1 | 8/2009 | Chino | |
| 2009/0213082 A1 | 8/2009 | Ku | |
| 2009/0213534 A1 | 8/2009 | Sakai | |
| 2009/0236151 A1 | 9/2009 | Yeh et al. | |
| 2009/0262096 A1 | 10/2009 | Teramoto | |
| 2009/0267916 A1 | 10/2009 | Hotelling | |
| 2009/0273571 A1 | 11/2009 | Bowens | |
| 2009/0273573 A1 | 11/2009 | Hotelling | |
| 2009/0277695 A1 | 11/2009 | Liu et al. | |
| 2009/0283340 A1 | 11/2009 | Liu et al. | |
| 2009/0303203 A1 | 12/2009 | Yilmaz et al. | |
| 2009/0309850 A1 | 12/2009 | Yang | |
| 2009/0314621 A1 | 12/2009 | Hotelling | |
| 2009/0324621 A1 | 12/2009 | Senter et al. | |
| 2010/0001966 A1 | 1/2010 | Lii et al. | |
| 2010/0006347 A1 | 1/2010 | Yang | |
| 2010/0013745 A1 | 1/2010 | Kim et al. | |
| 2010/0013800 A1* | 1/2010 | Elias | G06F 3/0418 345/178 |
| 2010/0044122 A1 | 2/2010 | Sleeman et al. | |
| 2010/0090979 A1 | 4/2010 | Bae | |
| 2010/0134422 A1 | 6/2010 | Borras | |
| 2010/0140359 A1 | 6/2010 | Hamm et al. | |
| 2010/0147600 A1 | 6/2010 | Orsley | |
| 2010/0149108 A1 | 6/2010 | Hotelling et al. | |
| 2010/0156839 A1 | 6/2010 | Ellis | |
| 2010/0163394 A1 | 7/2010 | Tang et al. | |
| 2010/0182273 A1 | 7/2010 | Noguchi et al. | |
| 2010/0188359 A1 | 7/2010 | Lee | |
| 2010/0214247 A1 | 8/2010 | Tang et al. | |
| 2010/0220075 A1* | 9/2010 | Kuo | G06F 3/044 345/174 |
| 2010/0253646 A1 | 10/2010 | Hiratsuka | |
| 2010/0258360 A1 | 10/2010 | Yilmaz | |
| 2010/0265210 A1 | 10/2010 | Nakanishi et al. | |
| 2010/0271330 A1 | 10/2010 | Philipp | |
| 2010/0277433 A1 | 11/2010 | Lee et al. | |
| 2010/0289770 A1 | 11/2010 | Lee et al. | |
| 2010/0291973 A1 | 11/2010 | Nakahara et al. | |
| 2010/0302201 A1* | 12/2010 | Ritter | G06F 3/044 345/174 |
| 2010/0321043 A1 | 12/2010 | Philipp et al. | |
| 2010/0321326 A1 | 12/2010 | Grunthaner et al. | |
| 2011/0018841 A1 | 1/2011 | Hristov | |
| 2011/0022351 A1 | 1/2011 | Philipp et al. | |
| 2011/0025639 A1 | 2/2011 | Trend et al. | |
| 2011/0048812 A1 | 3/2011 | Yilmaz | |
| 2011/0048813 A1 | 3/2011 | Yilmaz | |
| 2011/0057887 A1 | 3/2011 | Lin et al. | |
| 2011/0062969 A1 | 3/2011 | Hargreaves et al. | |
| 2011/0062971 A1* | 3/2011 | Badaye | G06F 3/044 324/686 |
| 2011/0063251 A1 | 3/2011 | Geaghan et al. | |
| 2011/0080357 A1 | 4/2011 | Park et al. | |
| 2011/0090159 A1 | 4/2011 | Kurashima | |
| 2011/0096016 A1 | 4/2011 | Yilmaz | |
| 2011/0109579 A1 | 5/2011 | Wang et al. | |
| 2011/0109590 A1 | 5/2011 | Park | |
| 2011/0141051 A1 | 6/2011 | Ryu | |
| 2011/0169770 A1 | 7/2011 | Mishina et al. | |
| 2011/0187666 A1 | 8/2011 | Min | |
| 2011/0267300 A1 | 11/2011 | Serban et al. | |
| 2011/0273391 A1 | 11/2011 | Bae | |
| 2011/0279169 A1 | 11/2011 | Salaverry | |
| 2012/0044171 A1 | 2/2012 | Lee et al. | |
| 2012/0050216 A1 | 3/2012 | Kremin et al. | |
| 2012/0056820 A1 | 3/2012 | Corbridge | |
| 2012/0313901 A1 | 12/2012 | Monson | |
| 2013/0181943 A1* | 7/2013 | Bulea | G06F 3/044 345/174 |
| 2014/0192027 A1* | 7/2014 | Ksondzyk | G01N 27/22 345/178 |
| 2014/0210765 A1* | 7/2014 | Peng | G06F 3/044 345/174 |
| 2014/0313169 A1* | 10/2014 | Kravets | G06F 3/044 345/178 |
| 2015/0317012 A1 | 11/2015 | Solven et al. | |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-20100136932 A1 | 12/2010 |

OTHER PUBLICATIONS

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.

Paul Leopardi, "A Partition of the Unit Sphere into Regions of Equal Area and Small Diameter", 2005.

ASIC Packaging Guidebook, Toshiba Corporation. (2000). 35 pages.

Fujitsu Microelectronics Limited. "IC Package." (2002). 10 pages.

Hal Philipp. "Charge Transfer Sensing", vol. 19, No. 2. 1999. pp. 96-105.

Mike Williams, "Dream Screens from Graphene", Technology Developed at Rice could Revolutionize Touch-Screen Displays. Aug. 2011.

Tracy V. Wilson et al. "How the iPhone Works", HowStuffWorks "Multi-touch Systems". 2011.

"IDT Claims World's First True Single-Layer Multi-Touch Projected Capacitive Touch Screen Technology", EE Times Europe. Dec. 8, 2010.

Shawn Day. "Low Cost Touch Sensor on the Underside of a Casing", IP.com. Oct. 14, 2004.

"Mesh Patterns for Capacitive Touch or Proximity Sensors", IP.com. May 14, 2010. 3pages.

Johannes Schoning et al. "Multi-Touch Surfaces: A Technical Guide", Technical Report TUM-I0833. 2008.

"Novel Single Layer Touchscreen Based on Indium", 2011.

Lubart, et al. "One Layer Optically Transparent Keyboard for Input Display", IP.com. Mar. 1, 1979. 3 Pages.

Gary L. Barrett et al. "Projected Capacitive Touch Technology", "Touch Technology Information Display", www.informationaldisplay. org <http://www.informationaldisplay.org>, Mar. 2010 vol. 26 No. 3, pp. 16-21.

Quantum Research Application Note An-KD01. "Qmatrix Panel Design Guidelines", Oct. 10, 2002. 4 Pages.

Colin Holland. "SID: Single Layer Technology Boosts Capacitive Touchscreens", www.eetimes.com/General. 2011.

Calvin Wang et al. "Single Side All-Point-Addressable Clear Glass Substrate Sensor Design", IP.com. Apr. 2, 2009. 3 Pages.

Olivier Bau, "TeslaTouch: Electrovibration for Touch Surfaces", 2010.

Ken Gilleo. "The Circuit Centennial", Apr. 28, 2003, Total of 7 pages.

Ken Gilleo, "The Definitive History of the Printed Circuit", 1999 PC Fab.

(56) References Cited

OTHER PUBLICATIONS

Quantum Research Group. "Qmatrix Technology White Paper", 2006. 4 Pages.
International Search Report, PCT/US2013/021314 dated Jun. 25, 2013.
International Search Report and Written Opinion dated Dec. 26, 2013 for Application No. PCT/US2013/057990.

\* cited by examiner

| -5 | 5 | 5 |
| --- | --- | --- |
| 0 | 7 | -2 |
| -2 | 30 | -1 |
| 0 | 63 | -2 |
| 0 | 31 | 2 |

FIG. 6

| -6 | 4 | 2 |
| --- | --- | --- |
| 0 | 11 | -4 |
| -2 | 26 | 1 |
| 0 | 107 | -4 |
| 0 | 6 | 0 |

SINGLE LAYER SENSOR PATTERN AND SENSING METHOD

CROSS-REFERENCE TO RELATED APPLICATIONS

This application claims priority to Chinese Patent Application Serial Number 201511030680.2, filed Dec. 31, 2015, which is incorporated by reference in its entirety.

BACKGROUND

Field

Embodiments of the present invention generally relate to input devices for touch sensing, and more specifically, to input devices that preferentially correct signals received on a first receiver electrode relative to signals received on a second receiver electrode.

Background of the Invention

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device may have sensor electrodes, such as receiver and transmitter electrodes, disposed on a single layer that is integrated with a display device, such as a tablet, touch screen or smart phone. The routing traces connecting the various sensor electrodes are susceptible to parasitic coupling to other electrodes with the input device, thereby increasing the complexity needed to accurately determine touch events. The conventional solution of such devices is to shield the routing traces using shielding electrodes. However, as the size and resolution of input devices continue to shrink, the physical area available for shield electrodes has also diminished, thus causing the space between the routing traces and sensor electrodes to also be reduced, which undesirably increases parasitic capacitance and reduces device performance.

This there is a need for an improved input device having routing traces and sensor electrodes formed on a single layer.

SUMMARY

This disclosure generally provides an input device, electronic systems and processing system for touch sensing. In one example, an input device for touch sensing includes a substrate, a plurality of receiver electrodes disposed on a first side of the substrate and arranged in a plurality of receiver electrode columns, and a plurality of transmitter electrodes disposed on the first side of the substrate and arranged in a plurality of transmitter electrode columns. Each transmitter electrode within each transmitter electrode column is paired with two adjacent receiver electrodes of a first column of the plurality of receiver electrode columns. A first plurality of traces is disposed on the first side of the substrate and coupling a first group of receiver electrodes in the first receiver electrode column of the plurality of receiver electrode columns, the first plurality of traces passing between one of the transmitter electrodes of the first transmitter electrode column and one of the receiver electrodes of the first receiver electrode column. A second plurality of traces disposed is on the first side of the substrate and coupling a second group of receiver electrodes in the first receiver electrode column, the second plurality of traces passing between one of the transmitter electrodes of the first transmitter electrode column and one of the receiver electrodes of the second group of receiver electrodes.

In another example, an electronic system with integrated touch sensing is provided that includes an input device and a processing system. The input device includes a plurality of receiver electrodes, a plurality of transmitter electrodes and a trace. Each transmitter electrode is paired with and substantially surrounded by two adjacent receiver electrodes of the plurality of receiver electrodes. The trace is coupled to a first receiver electrode of the plurality of receiver electrodes that is paired with a second receiver electrode of the plurality of receiver electrodes. The trace is routed between the second receiver electrode and the transmitter electrode that is paired with the first transmitter electrode. The processing system is configured to determine presence of an input object in a sensing region of the input device. The processing system is also configured to drive sensing signals on the transmitter electrode paired with the first and second receiver electrodes, receive effects of sensing signals received on the second receiver electrode, and preferentially correct signals received on the second receiver electrode relative to signals received on the first receiver electrode.

In another example, a processing system for touch sensing is provided. The processing system includes a driver module comprising driver circuitry configured to drive sensing signals on the transmitter electrode paired with a first receiver electrode and a second receiver electrode, a receiver module, and a correction module configured to received preferentially correct the first output signal relative to the second output signal. The receiver module, including detection circuitry, is configured to receive resulting signals with the first receiver electrode and the second receiver electrode, output a first output signal corresponding to the resulting signals received with the first receiver electrode, and output a second output signal corresponding to the resulting signals received with the second receiver electrode.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present disclosure provide input devices, processing systems and methods for touch sensing that have routing traces and sensor electrodes formed on a single layer. The sensor electrodes of the input device include transmitter electrodes that are shielded by one column of receiver electrodes from adjacent columns of receiver electrodes. In other embodiment, a processing system is disclosed that preferentially correct signals received on a first receiver electrode relative to signals received on a second receiver electrode, thus compensating for electrode geometry and trace routings that inherently do not provide a uniform response to an input object.

Figure 1:
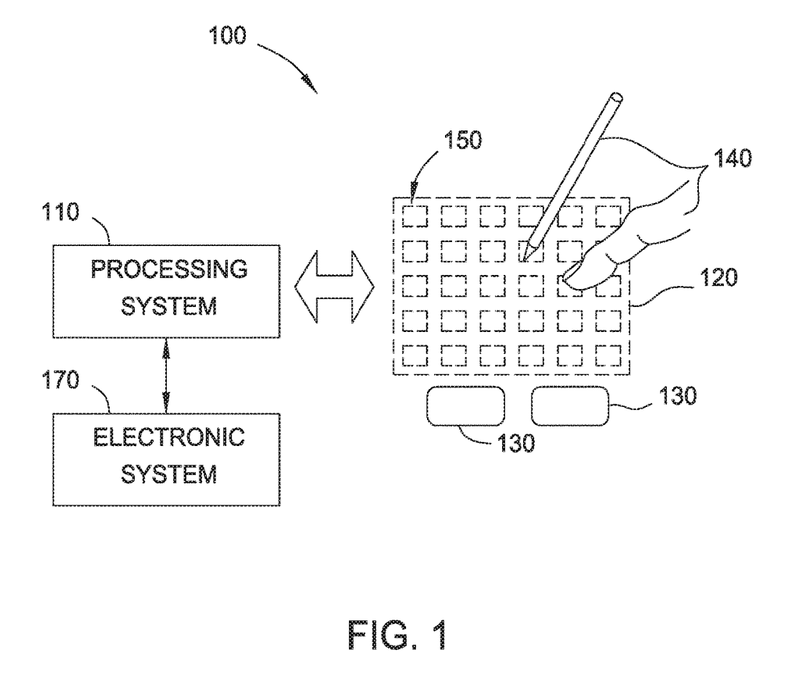
FIG. 1 is schematic diagram of an exemplary input device integrated with a display device.

Turning now to the figures, FIG. 1 is a block diagram of an exemplary input device 100, in accordance with embodiments of the invention. The input device 100 may be configured to provide input to an electronic system 170. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 150 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
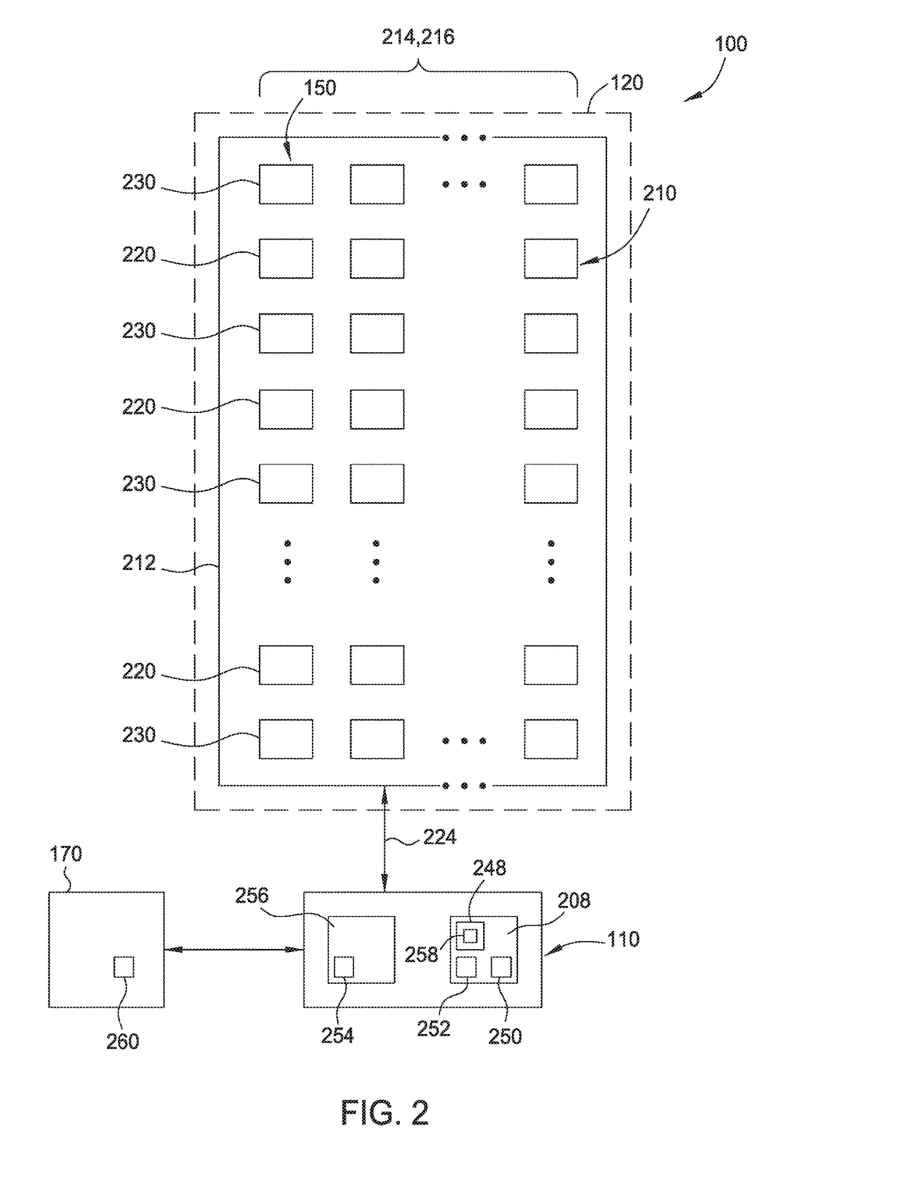
FIG. 2 is a schematic plan view of the input device of FIG. 1 illustrating an exemplary pattern of sensor electrodes of the input device coupled to a processing system.

FIG. 2 illustrates a portion of an exemplary pattern of sensing elements 150 according to some embodiments. For clarity of illustration and description, FIG. 2 shows the sensing elements 150 in a pattern of simple rectangles and does not show various components, such as various interconnects between the sensing elements 150 and the processing system 110. The sensing elements 150 disposed below the sensing region 120 may be arranged in an electrode pattern 210. The electrode pattern 210 comprises a first plurality of sensor electrodes 220 and a second plurality of sensor electrodes 230, both of which are formed on a single layer disposed on a substrate 212. The sensor electrodes 230 may be arranged in a plurality of columns 214. The sensor electrodes 230 comprising each column 214 may be linearly aligned, or have a non-linear arrangement, such as a zig-zag arrangement. The first plurality of sensor electrodes 220 are also arranged in a plurality of columns 216, with each column 216 of sensor electrodes 220 disposed within a corresponding column 214 of the sensor electrodes 230. In the embodiment depicted in FIG. 2, sensor electrodes 220, 230 comprising the columns 214, 216 are rectangular and have a co-linear arrangement. It is contemplated that the electrode pattern 210 may be configured with electrodes 220, 230 arranged in other suitable patterns. Further, the shape of sensor electrodes 230 may not be constrained to rectangular dimension, and may be tessellated or approximately space filling repeating array structure. In various embodiments, the first plurality of sensor electrodes 220 are operated as a plurality of transmitter electrodes (referred to specifically as "transmitter electrodes 220"), and the second plurality of sensor electrodes 230 are operated as a plurality of receiver electrodes (referred to specifically as "receiver electrodes 230"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 220, the second plurality of sensor electrodes 230, or both can be disposed within the sensing region 120. The sensor electrodes 220, 230 of the electrode pattern 210 can be coupled to the processing system 110.

The first plurality of electrodes 220 and the second plurality of electrodes 230 are typically ohmically isolated from each other. That is, one or more insulators separate the first plurality of electrodes 220 and the second plurality of electrodes 230 and prevent them from electrically shorting to each other. In some embodiments, the first plurality of electrodes 220 and the second plurality of electrodes 230 are separated by insulative material disposed between them, which may include air. As discussed above, the first plurality of electrodes 220 and the second plurality of electrodes 230 are disposed on the same side of the single substrate 212.

The areas of localized capacitive coupling between the first plurality of sensor electrodes 220 and the second plurality sensor electrodes 230 may be form "capacitive pixels" of a "capacitive image." The capacitive coupling between sensor electrodes of the first and second pluralities 220 and 230 changes with the proximity and motion of input objects in the sensing region 120. Further, in various embodiments, the localized capacitive coupling between each of the first plurality of sensor electrodes 220 and the second plurality of sensor electrodes 230 and an input object may be termed "capacitive pixels" of a "capacitive image." In some embodiments, the localized capacitive coupling between each of the first plurality of sensor electrodes 220 and the second plurality of sensor electrodes 230 and an input object may be termed "capacitive measurements" of "capacitive profiles."

The processing system 110 can include a sensor module 208 having sensor circuitry. The sensor module 208 may include a sensing controller 250, and one or more source drivers 252. The sensing controller 250 uses the sensor circuitry to operate the sensor electrode pattern 210 to receive resulting signals from sensor electrodes in the sensor electrode pattern using a capacitive sensing signal having a sensing frequency. Processing system 110 may also comprise one or more multiplexers coupled to sensor electrodes 220, 230. One or more sensor electrode from sensor electrodes 220 or 230 may be coupled to each multiplexer, where a multiplexer at least one of couples one or more sensor electrodes to the sensing circuitry and the source driver 252. Further, a multiplexer may be disposed within sensor module 208 or external to sensor module 208.

The determination module 256 includes firmware and/or circuitry, and is configured to determine capacitive measurements from the resulting signals. The determination module 256 can track changes in capacitive measurements to detect input object(s) in the sensing region 120, and from the changes in capacitive measurements, provide a signal indicative of the location of the input object(s) in the sensing region 120. The processing system 110 can include other modular configurations, and the functions performed by the sensor module 208 can, in general, be performed by one or more modules in the processing system 110. The processing system 110 can include modules, and can perform other functions as described in some embodiments below.

The sensor module 208 of the processing system 110 can operate in an absolute capacitive sensing mode or a transcapacitive sensing mode. In an absolute capacitive sensing mode, receiver(s) in the sensor circuitry measure voltage, current, or charge on sensor electrode(s) in the electrode pattern 210 while the sensor electrode(s) are modulated with absolute capacitive sensing signals to generate the resulting signals. The determination module 256 generates absolute capacitive measurements from the resulting signals. The determination module 256 can track changes in absolute capacitive measurements to detect input object(s) in the sensing region 120.

In a transcapacitive sensing mode, transmitter(s) in the sensor circuitry of the sensor module 208 drive one or more of the first plurality of electrodes 220 with the capacitive sensing signal (also referred to as a transmitter signal or modulated signal in the transcapacitive sensing mode). Receiver(s) in the sensor circuitry of the determination module 256 measure voltage, current, or charge on one or more of the second plurality of electrodes 230 to generate the resulting signals. The resulting signals comprise the effects of the capacitive sensing signal and input object(s) in the sensing region 120. The determination module 256 generates transcapacitive measurements from the resulting signals. The determination module 256 can track changes in transcapacitive measurements to detect input object(s) in the sensing region 120. As further discussed below, the determination module 256 preferentially corrects signals received on a first receiver electrode 230 relative to signals received on a second receiver electrode 230, thus compensating for electrode geometry and trace routings that inherently do not provide a uniform response to an input object In some embodiments, the processing system 110 "scans" the electrode pattern 210 to determine capacitive measurements. Each line scanned of the electrode pattern 210 may be referred to as a sensing event. In the transcapacitive sensing mode, the sensing controller 250 of the processing system 110 can drive the first plurality of electrodes 220 to transmit transmitter signal(s). A line of the pattern of sensor electrodes may refer to a grouping of sensor electrodes. The line may be a row, column or any other grouping of sensor electrodes. Line rate refers to the period utilized to update a line, either for display updating or for capacitive sensing. Multiplexers may be used to define the order in which the sensor electrodes are scanned. The multiplexers may selectively configure which sensor electrode or sensor electrodes are coupled to the sensing circuitry of the determination module 256. The sensor circuitry may comprise a plurality of analog front ends (AFEs), each coupled to a multiplexer. The analog front end may comprise an integrator and other circuitry configured to integrate the amount of charge driven onto the sensor electrode. The sensing controller 250 of the processing system 110 can operate the first plurality of electrodes 220 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 230 to be independently determined. In the absolute capacitive sensing mode, the determination module 256 of the processing system 110 can receiving resulting signals from one sensor electrode 220, 230 at a time, or from a plurality of sensor electrodes 220, 230 at a time. In either mode, the sensing controller 250 of the processing system 110 can operate the second plurality of electrodes 230 singly or collectively to acquire resulting signals. In absolute capacitive sensing mode, the sensing controller 250 of the processing system 110 can concurrently drive all electrodes along one or more axes. In some examples, the processing system 110 can drive electrodes along one axis (e.g., along the first plurality of sensor electrodes 220) while electrodes along another axis are driven with a shield signal, guard signal, or the like. In some examples, some electrodes along one axis and some electrodes along the other axis can be driven concurrently.

In the transcapacitive sensing mode, the determination module 256 of the processing system 110 can use the resulting signals to determine capacitive measurements at the capacitive pixels. A set of measurements from the capacitive pixels form a "capacitive image" (also "capacitive frame") representative of the capacitive measurements at the pixels. The determination module 256 of the processing system 110 can acquire multiple capacitive images over multiple time periods (i.e., sensing events), and can determine differences between capacitive images to derive information about input in the sensing region 120. For example, the determination module 256 of the processing system 110 can use successive capacitive images acquired over successive periods of time to track the motion(s) of one or more input objects entering, exiting, and within the sensing region 120.

In absolute capacitive sensing mode, the determination module 256 of the processing system 110 can use the resulting signals to determine capacitive measurements along an axis of the sensor electrodes 220 and/or an axis of the sensor electrodes 230 (e.g., along one or more columns or rows). A set of such measurements forms a "capacitive profile" representative of the capacitive measurements along the axis. The determination module 256 of the processing system 110 can acquire multiple capacitive profiles along one or both of the axes over multiple time periods and can determine differences between capacitive profiles to derive information about input in the sensing region 120. For example, the determination module 256 of the processing system 110 can use successive capacitive profiles acquired over successive periods of time to track location or proximity of input objects within the sensing region 120. In other embodiments, each sensor electrode can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the determination module 256 of the processing system 110 can estimate the baseline capacitance in various ways. For example, in some embodiments, the determination module 256 of the processing system 110 takes "baseline images" or "baseline profiles" when no input object is determined to be in the sensing region 120, and uses those baseline images or baseline profiles as estimates of baseline capacitances. The determination module 256 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

The time required to obtain a complete capacitive frame by scanning all the capacitive pixels across the sensing region 120 divided by the number of discreet capacitive scanning events defines the capacitive sensing frame rate. The capacitive sensing frame report rate is based on the duty cycle of the sensor module 208 and the duty cycle indicated by the host device of the electronic system communicating with the input device 100. As discussed above, it is advantageous for the capacitive sensing frame rate to be maintained substantially constant, even when the display refresh rate is changed. The methodology maintaining a fairly constant capacitive sensing frame rate is further detailed below.

In some touch screen embodiments, at least one of the first plurality of sensor electrodes 220 and the second plurality of sensor electrodes 230 comprise one or more display electrodes of a display device 280 used in updating a display of a display screen, such as one or more segments of a "Vcom" electrode (common electrodes), gate electrodes, source electrodes, anode electrode and/or cathode electrode. The updating or refresh of each line of the panel of the display device 280 may be referred to as a display line update event. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. Conductive routing traces 240 coupled to the sensor electrodes 220, 230 may be disposed on the same layer of the substrate 212 as the sensor electrodes 220, 230. The display electrodes can also be referred to as "combination electrodes," since the display electrodes perform functions of display updating and capacitive sensing. In various embodiments, each sensor electrode of the first and second plurality of sensor electrodes 220 and 230 comprises one or more combination electrodes. In other embodiments, at least two sensor electrodes of the first plurality of sensor electrodes 220 or at least two sensor electrodes of the second plurality of sensor electrodes 230 may share at least one combination electrode. Furthermore, in one embodiment, both the first plurality of sensor electrodes 220 and the second plurality electrodes 230 are disposed within a display stack on the display screen substrate. Additionally, at least one of the sensor electrodes 220, 230 in the display stack may comprise a combination electrode. However, in other embodiments, only the first plurality of sensor electrodes 220 or the second plurality of sensor electrodes 230 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having at least the sensing controller 250, the source drivers 252, the synchronization module 254, and the determination module 256 formed on a single IC chip. In another embodiment, the processing system 110 can include a plurality of integrated circuit (IC) chips, where the sensing controller 250, the source drivers 252, and synchronization module 254 (and optionally the determination module 256) can be divided among two or more IC chips. For example, at least the sensing controller 250 and synchronization module 254 can be configured as one integrated circuit chip. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a touch driver module and/or a display (i.e., source) driver module. In various embodiments, where the processing system 110 comprises a plurality of integrated circuits comprising a timing controller (TCON) and source driver integrated circuits. The timing controller is configured receive display update data and sensing configuration data from a host device of the electronic system communicating with the input device 100. The timing control processes the received display update data and sensing configuration data and communicates the processed data to each of the source driver integrated circuits. The source driver integrated circuits comprise one or more source drivers, each coupled to and configured to drive a source line of the display device for display updating. Further, the source driver integrated circuit may comprise sensing circuit configured to modulate sensor electrodes and/or receive resulting signals from the sensor electrode for capacitive sensing. The timing controller, source driver or host may comprise the determination module 256 configured to process the resulting signals to determine positional information. The source driver integrated circuits may be configured to communicate raw sensing data, partially processed sensing data or positional information to the timing controller, for further processing or the timing controller may directly communicate this information to the host. In other embodiments, the timing control may be configured to process the sensing data received from the source driver integrated circuits to determine positional information for one or more input objects. In various embodiments each source driver integrated circuit may comprise one or more of plurality of digital-to-analog converters (DAC), gamma control, source buffer, Vcom reference, data receiver, buffer, modulator, AFEs, etc. The timing controller may comprise one or more of a frame buffer (full or partial), host data receiver, gate control, determination module etc. A power management integrated circuit may be coupled to at least one of the timing controller and each source driver integrated circuit and may configured to provide a high gate voltage, low gate voltage, Vcom voltage, display voltage supply modulation, etc.

Figure 3:
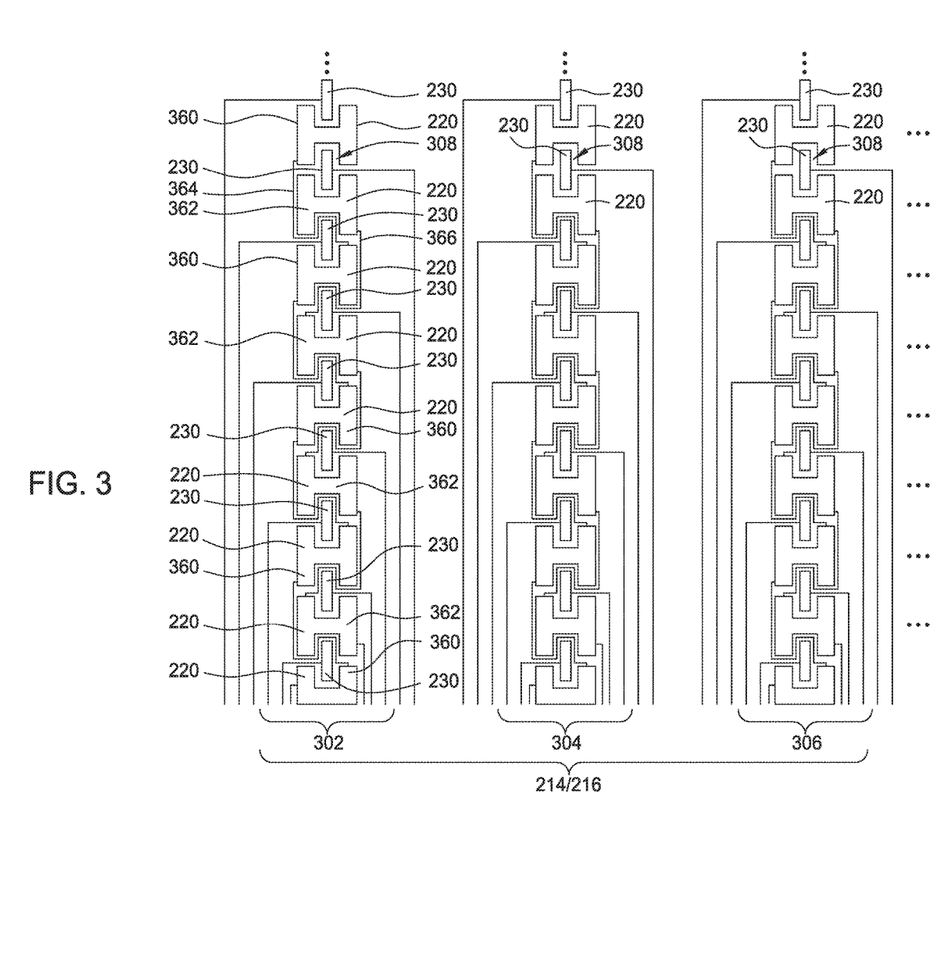
FIG. 3 is an enlarged partial plan view of a portion of the pattern of sensor electrodes illustrated in FIG. 2 illustrating transmitter electrodes and receiver electrodes arranged in columns.

FIG. 3 is an enlarged portion of the pattern of sensor electrodes 220, 230 illustrated in FIG. 2, illustrating three adjacent pairs of co-linear columns 214, 216 of sensor electrodes 220, 230. For convenience of explanation, the three adjacent pairs of co-linear columns 214, 216 referred hereinafter as sensor column 302, sensor column 304, and sensor column 306. The sensor columns 302, 304, 306 are generally parallel, or alternatively, generally aligned offset from each other as part of a repeating pattern of sensor electrodes. The sensor column 304 is disposed between sensor column 302 and sensor column 306.

The sensor electrodes 220, 230 comprising sensor column 304 will now be described in detail. The sensor columns 302, 306 are similarly arranged.

Adjacent sensor electrodes 220 within the column 214 comprising sensor column 304 have a geometric shape that defines a transmitter electrode receiving pocket 308. The transmitter electrode receiving pocket 308 is sized to allow one of the transmitter electrodes 230 of the column 216 that is part of the sensor column 304 to be disposed in the transmitter electrode receiving pocket 308. The transmitter electrode receiving pocket 308 may be essentially defined within one of the adjacent sensor electrodes 220, or partially within both of the adjacent sensor electrodes 220.

Figure 4:
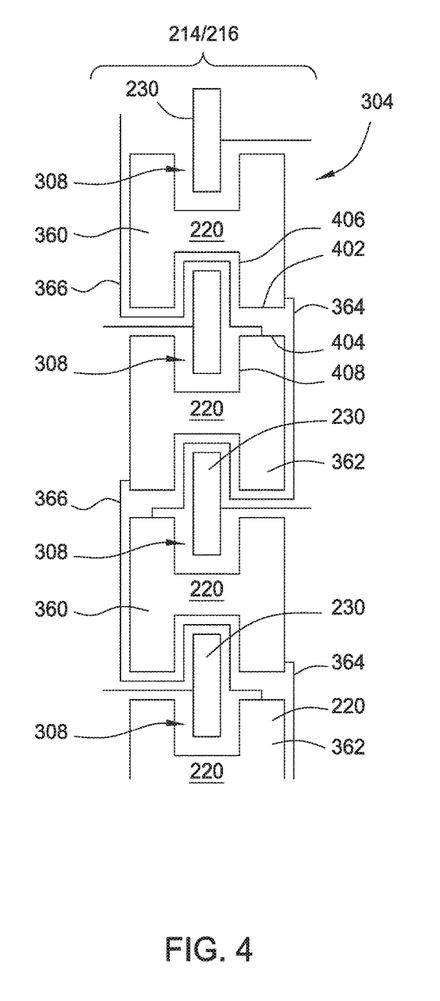
FIG. 4 is an enlarged partial plan view of one of the columns from the pattern of sensor electrodes illustrated in FIG. 3 depicting the interface between the transmitter electrodes and the receiver electrodes.

Referring additionally to the enlargement of the column 304 depicted in FIG. 4, the adjacent sensor electrodes 220 have opposing faces 402, 404. Each face 402, 404 includes a recess 406, 408. A portion of the transmitter electrode 230 disposed between the adjacent sensor electrodes 220 extends into each recess 406, 408.

The arrangement between the sensor electrodes 220, 230 within the sensor column 304 may also be described as each transmitter electrode 230 within the column 216 is interleaved with the adjacent receiver electrodes 220 of the sensor column 304. In this manner, the transmitter electrodes 230 of the sensor column 304 are shielded from the receiver electrodes 220 of the adjacent sensor columns 302, 306 by the receiver electrodes 220 of the sensor column 304. In the context of this disclosure, the term "shielded" is intended to connote that a receiver electrode 220 of the sensor column 304 of the subject transmitter electrode 230 is physically present between the subject transmitter electrode 230 and the receiver electrodes 220 of the neighboring sensor columns 302, 306, except for the relatively small gaps provided to allow for routing electrical traces 224, as further discussed below. Having the transmitter electrodes 230 shielded by the receiver electrodes 220 within a common column reduces parasitic capacitive coupling to other receiver electrodes 220 disposed within neighboring columns.

As discussed above, there is no grounded or shield electrode disposed between the transmitter and receiver electrodes 230, 220 of the neighboring sensor columns 302, 304, 306, or between the sensing elements 150 and the electrical traces 224. The omission of the grounded or shield electrode dramatically increases overall sensitivity of capacitive coupling between the transmitter and receiver electrodes 230, 220 as compared to other single layer sensors.

Figure 5:
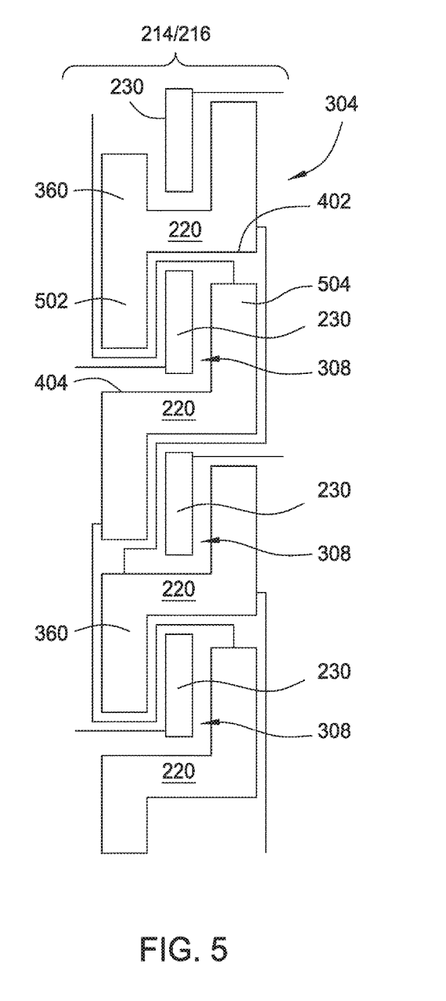
FIG. 5 is an enlarged partial plan view of an alternative embodiment of a column of transmitter electrodes and the receiver electrodes which may be utilized in the input device of FIG. 1.

FIG. 5 is an enlarged partial plan view of an alternative embodiment of the column 304 of transmitter electrodes 230 and the receiver electrodes 220 which may be utilized in the input device 100 of FIG. 1. In the embodiment depicted in FIG. 5, the face 402 of one receiver electrode 220 may include a protrusion or finger 502 that shields the transmitter electrode 230 from one of the neighboring sensor columns (for example, sensor columns 302, 306 illustrated in FIG. 3), while the face 404 of the adjacent receiver electrode 220 of the column 214 may include a protrusion or finger 504 that shields the transmitter electrode 230 from the other neighboring sensor column. Described in a different manner, the fingers 502, 504 overlap in a spaced manner to form the transmitter electrode receiving pocket 308 between the opposing faces 402, 404 of the adjacent receiver electrodes 220. It is contemplated that other geometry for the electrodes 220, 230 may be utilized to shield the transmitter electrodes 230 from one of the neighboring sensor columns without the use of ground or shield electrodes common in conventional devices.

Returning back to FIG. 3 and FIG. 4, within the column 214 of receiver electrodes 220 of the sensor column 304, the receiver electrodes 220 are electrically coupled to form a plurality of electrically separate groups. In the embodiment depicted in FIG. 3, a first plurality of the receiver electrodes 220 may be coupled together to form a first group 360 within the column 214 comprising the sensor column 304, while a second plurality of the receiver electrodes 220 may be coupled together to form a second group 362 within the column 214 comprising the sensor column 304.

The receiver electrodes 220 of the first group 360, coupled to the processing system 110 by the routing trace 240, may be serially coupled together by a routing trace 364. In one example, the trace 364 serially couples the receiver electrodes 220 of the first group 360. The receiver electrodes 220 of the second group 362, coupled to the processing system 110 by the routing trace 240, may be serially coupled together by a routing trace 366. In one example, the trace 366 serially couples the receiver electrodes 220 of the second group 362. The traces 364, 366 are formed on same substrate 212 as the sensing elements 150 (i.e., the electrodes 220, 230), which reduces the cost of manufacture. The traces 364, 366 are routed between the faces 402, 404 of the neighboring receiver electrodes 220, one of which belonging to each of the first and second groups 360, 362. In one example, the traces 364, 366 are routed through the transmitter electrode receiving pocket 308, and, in some embodiments, into at least one of the recesses 406, 408. The serpentine routing of the traces 364, 366 within the receiver electrode pairs within the groups 360, 362 increases the capacitive coupling during sensing, which improves sensor performance by providing a more robust signal in response to the presence of an input object 140 in the sensing region 120.

The presence of the trace 364 between the transmitter electrode 230 and receiver electrode 220 of the first group 360, and similarly, the presence of the trace 364 between the transmitter electrode 230 and receiver electrode 220 of the second group 362, may cause some receiver electrodes 220 to receive a stronger resulting signal in response to signals driven onto that transmitter electrode 230 since the trace and receiver electrode 220 coupled thereto substantially circumscribe the transmitter electrode 230, as compared to the signals received by receiver electrodes 220 which have a trace coupled to a different group of receiver electrodes 220 disposed between the driving transmitter electrode 230 and the receiver electrodes 220. Thus, certain rows of receiver electrodes 220 will have stronger signal response as compared to other rows of receiver electrodes 220. For example, each transmitter electrode 230 has one adjacent "strong" receiver electrode 220 and one of the traces coupled thereto substantially circumscribing the transmitter electrode 230, and one adjacent "weak" receiver electrode 220 which is separated from the transmitter electrode 230 by the trace of the strong receiver electrode 220. The difference in response between "strong" rows and "weaker" rows of receiver electrodes 220 is schematically illustrated in FIGS. 6-7 discussed below.

Figure 6:
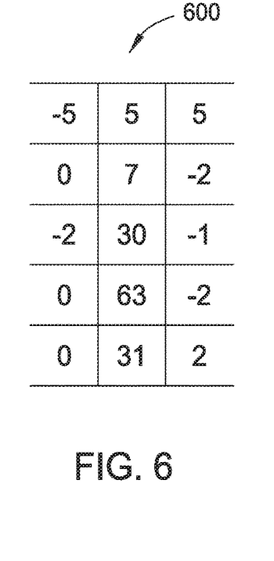
FIG. 6 is a schematic diagram of a portion of a register map illustrating the response of the input device when an input object is present in a first location of a sensing region of the input device.
Figure 7:
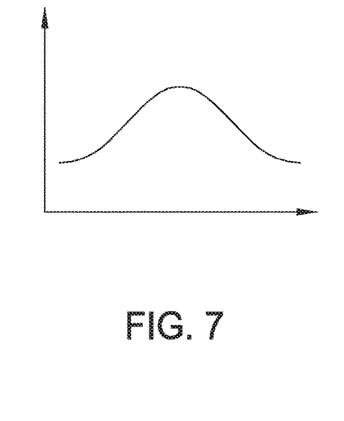
FIG. 7 is a graph illustrating a signal response to position relationship corresponding to the register map illustrated in FIG. 6.

FIG. 6 is a schematic diagram of a portion of a register map 600 illustrating the response of the input device 100 when an input object 140 is present in a first location of the sensing region 120 of the input device 100. FIG. 7 is a graph illustrating a signal response to position relationship corresponding to the register map 600 illustrated in FIG. 6. The amplitude of the signal response is plotted on the Y-axis, while the row position within the column is plotted on the X-axis.

The portion of the register map 600 illustrates a portion of three (3) columns of the many columns comprising the sensing elements 150. The 3 columns represented in FIG. 6 may be the columns 302, 304, 306, or any other columns of sensing elements 150. Each square in the register map 600 is representative of a location in the sensing region 120 corresponding to one of capacitive sensing pixels defined between a receiver electrode 220 and transmitter electrode 230 of the input device 100. The numerical value disposed in each square of the register map 600 is representative of the signal received by the receiver electrodes 220 corresponding to that location in the sensing region 120. In the example shown in FIG. 6, the input object 140 is interfaced with the input device 100 essentially above the receiver electrode 220, as illustrated by the high signal 63 shown in position 602 of the register map 600. The input object 140 is not above positions 604, 606 that are adjacent the position 602. As the receiver electrode 220 corresponding to position 602 is a weak receiver electrode 220, the receiver electrodes 220 in the rows of the column directly above and below receiver electrode 220 corresponding to position 602 of the register map 600 will also have relatively strong signals. For example, the receiver electrode 220 corresponding to position 604 directly above position 602 of the register map 600 may have a signal amplitude of 30, while the receiver electrode 220 corresponding to position 606 directly below position 602 of the register map 600 may have a signal amplitude of 31. The relatively high signals in positions 604, 606 relative to the other locations of the input device 100 results in a relatively flat signal response, as seen by the corresponding signal trace 700 illustrated in FIG. 8. As the signal in position 602 actually corresponds to the actual presence of the input object 140 at the position 602, the signal corresponding to position 602 may be referred to as a true signal. As the relatively high signals in positions 604, 606 do not correspond to the actual presence of the input device in the positions 604, 606, the signals corresponding to the positions 604, 606 may be referred to as false signals.

The flat signal response illustrated by the register map 600 and signal trace 700 can be improved by processing the signals utilizing the processing system 110 to decouple the signals of the strong and weak rows. Decoupling the signals of the strong and weak rows provides a more robust touch signal that recovers the real touch profile. The signals may be processed by the processing system 110 to decouple the signals received by strong and weak rows utilizing an algorithm to at least one or more of (1) remove or reduce the false signals, and (2) enhance the true signal.

Figure 8:
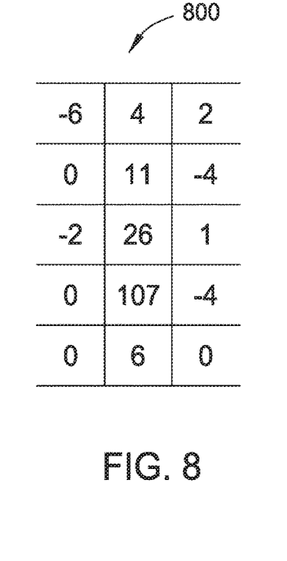
FIG. 8 is an another schematic diagram of a portion of a register map illustrating the response of the input device when an input object is present in a second location of the sensing region of the input device.
Figure 9:
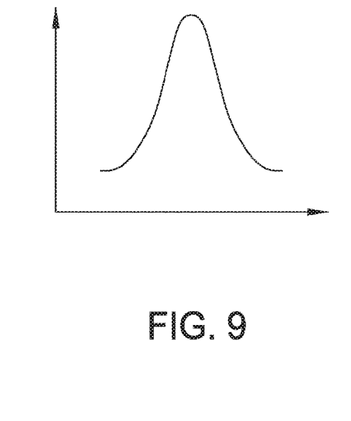
FIG. 9 is another graph illustrating a signal response to position relationship corresponding to the register map illustrated in FIG. 8.

FIG. 8 is a schematic diagram of a portion of a register map 800 illustrating the response of the input device 100 when an input object 140 is present in a first location of the sensing region 120 of the input device 100 after signals have been processed by the processing system 110 to decouple the strong and weak rows. FIG. 9 is a graph illustrating a signal response to position relationship corresponding to the register map 800 illustrated in FIG. 8. The amplitude of the signal response is plotted on the Y-axis, while the row position within the column is plotted on the X-axis.

The portion of the register map 800 illustrated in FIG. 8 corresponds to the portion of the register map 600 illustrated in FIG. 6. In the example shown in FIG. 8, the amplitude of the signal in position 602 has been enhanced to 107 from the amplitude of 63 shown in position 602 of the register map 600. Additionally, the amplitude of the signal in position 604 has been reduced to 26 from the amplitude of 30 shown in position 604 of the register map 600, while the signal in position 606 has been reduced to an amplitude of 6 from the amplitude of 31 shown in position 606 of the register map 600. Thus as illustrated in by the trace 900 shown in FIG. 9, the response illustrated by the register map 800 and signal trace 900 clearly shows a crisp peak at position 602, which is indicative of the actual position of the input object 140 within the sensing region 120. By comparison, the corrected signal illustrated by the trace 900 shown in FIG. 9 provides substantially improved positional accuracy as compared to the trace 700 shown in FIG. 7 to the reduction of false signals and the enhancement of true signals.

Returning to FIG. 2, the sensor module 208 of the processing system 110 drives a sensing signal on the transmitter electrodes 230. The sensor module 208 then receives resulting signals from the receiver electrodes 220. As the receiver electrodes 220 are scanned to receive the resulting signals, the sensor module 208 determines if the resulting signals are being received from a strong or weak receiver electrode 220. The sensor module 208 can make the strong or weak determination from information relating to which receiver electrode 220 is being scanned and knowledge of the corresponding geometric configuration of the traces, transmitter and receiver electrodes.

If the resulting signals are being received from a strong electrode 220, the resulting signals processed using an integrator and subsequently provided to the determination module 256. The resulting signals may be provided either analog or digital form.

If the resulting signals are being received from a weak electrode 220, the resulting signals are provided to a correction module 248, which corrects the signals as discussed above. The correction module 248 may be disposed in the same integrated circuit chip as the sensor module 208, embodied in another integrated circuit chip, or implemented as software and/or firmware residing in the determination module 256, or other location. In one example, the correction module 248 may include a filter 258 having circuitry that at least one or both of (1) removes or reduces the false signals, and (2) enhances the true signal. The filter 258 may be set to reduce false signals by a predetermined amount. The predetermined amount that the filter 258 reduces false signals may be set in an initiation process, for example, at manufacturing. The initiation process may include determining a magnitude of the false signals via a testing protocol, then setting the filter in response to the magnitude. In another example, the predetermined amount that the filter 258 reduces false signals may be set using a tuning factor. The tuning factor may be set during manufacturing, during an initiation process, or during use of the input device. The tuning factor may be selected from a look-up table accessed by the correction module 248. The tuning factor may be provided to the filter 258 of the correction module 248 may a host processor 260 or other source within the electronic system 170 that is coupled to the processing system 110. The tuning factor may be set once, set periodically, or updated as desired.

In embodiments wherein the filtering functions of the correction module 248 are performed in a processor 254 of the determination module 256, the resultant signals from the weak receiver electrode 220 may be converted in the sensor module 208 and provided to the processor 254 in digital form. For example, the processor 254 may receive a digital conversion of the resultant signals, the digital conversion including at least one or both of false signals and true signals; process the digital conversion signals generate corrected signals that at least one or both of (1) has information relating to false signals removed or reduced, and (2) has information relating to the true signal enhanced; and determine positional information from the corrected signals.

Figure 10:
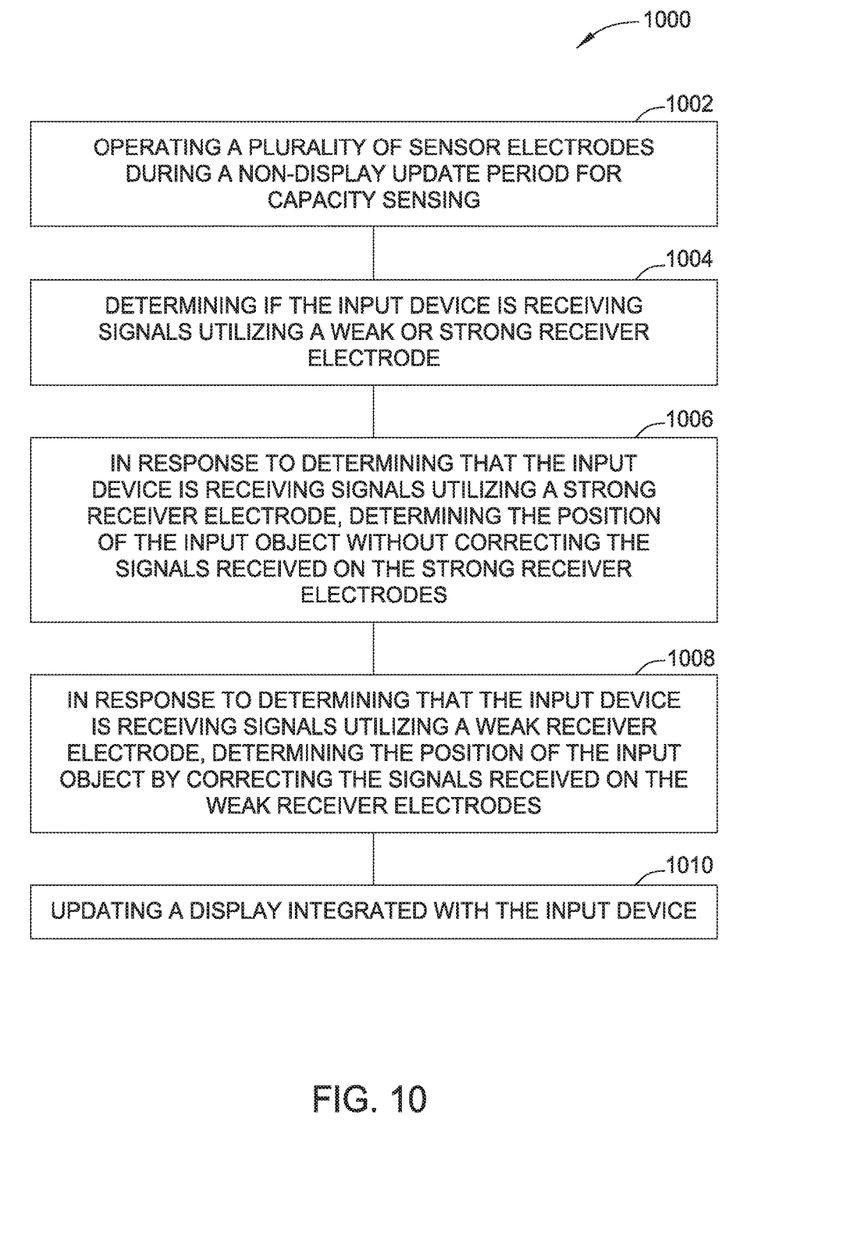
FIG. 10 is a flow diagram of a method for operating an input device.

FIG. 10 is a flow diagram of a method 1000 for operating an input device, such as the input device 100 described above, among others. The method 1000 begins at operation 1002 by driving a sensing signal on a plurality of sensor electrodes 220, 230 during a non-display update period for capacity sensing. The sensing signal may be provided to the one or more of the sensor electrodes 220, 230 for operating in either a transcapacitive or absolute sensing technique. At operation 1002, the sensor module 208 selects one or more first transmitter electrodes 230, drives a sensing signal on the selected first transmitter electrode 230, selects another one or more second transmitter electrodes 230, drives a sensing signal on the selected second transmitter electrode 230, and repeats the selection and driving operations until all of the rows of transmitter electrodes 230 comprising a predefined column of sensing elements have been scanned through.

At operation 1004, the sensor module 208 determines if the input device 100 is receiving signals utilizing a weak or strong receiver electrode 230.

If the input device 100 is receiving signals utilizing the strong receiver electrodes 230, the sensor module 208 provides the receiving signals (or digital conversion thereof) to the determination module 256 for the determination module 256 to determine the position of the input object 140 without correcting the signals received on the strong receiver electrodes 230 at operation 1006. In one embodiment, the determination module 256 processes the signals without correcting the signals by not passing the resultant signal through the filter 258 of the sensor module 208.

If the input device 100 is receiving signals utilizing the weak receiver electrodes 230, the sensor module 208 corrects the signals received on the weak receiver electrodes 230 at operation 1008. Correcting the signal at operation 1008 may include processing the resultant signal acquired using the weak receiver electrode 220 to at least one or both of (1) remove or reduce the false signals, and (2) enhance the true signal. Correcting the signal may include directing the signal at operation 1008 through the filter 258 to process the signals as discussed above. Alternatively, correcting the signal may include digitally processing the signal at operation 1008 in the determination module 256 to correct the signals as discussed above.

At optional operation 1010, a display integrated with the input device is updated during a display update period for capacity sensing. In one example, the display update period may be separate in time from the non-display update. In another example, the display update period may be overlapped in time from the non-display update. In another example, the display update period may be occur simultaneously with the non-display update.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. An input device for touch sensing, the input device comprising:
    a substrate having a first side;
    a plurality of receiver electrodes disposed on the first side of the substrate and arranged in a plurality of receiver electrode columns;
    a plurality of transmitter electrodes disposed on the first side of the substrate and arranged in a plurality of transmitter electrode columns, each transmitter electrode within each transmitter electrode column is paired with two adjacent receiver electrodes of a first receiver electrode column of the plurality of receiver electrode columns;
    a first plurality of traces disposed on the first side of the substrate and coupling a first group of receiver electrodes in the first receiver electrode column, the first plurality of traces passing between one of the transmitter electrodes of a first transmitter electrode column of the plurality of transmitter electrode columns and one of the receiver electrodes of the first receiver electrode column; and
    a second plurality of traces disposed on the first side of the substrate and coupling a second group of receiver electrodes in the first receiver electrode column, the second plurality of traces passing between one of the transmitter electrodes of the first transmitter electrode column and one of the receiver electrodes of the first group of receiver electrodes.

2. The input device of claim 1, wherein each of the receiver electrodes comprising the first receiver electrode column of the plurality of receiver electrode columns comprises:
    a receiver electrode body having two recesses, each recess formed in opposite sides of the receiver electrode body, the recesses having an orientation that substantially aligns with a direction in that the first receiver electrode column is oriented.

3. The input device of claim 2, wherein the transmitter electrodes of the first transmitter electrode column of plurality of transmitter electrode columns comprise:
    a transmitter electrode body having a first end and a second end, the first and second end extending into recesses in adjacent receiver electrode bodies of the receiver electrodes arranged in the first receiver electrode column.

4. The input device of claim 1, further comprising:
    a plurality of transmitter electrode traces routed to transmitter electrodes comprising the first transmitter electrode column that is paired with the first receiver electrode column, wherein the transmitter electrode traces connect to adjacent transmitter electrodes from opposite sides of the first transmitter electrode column.

5. The input device of claim 4, further comprising:
    a plurality of receiver electrode traces routed between receiver electrodes comprising the first receiver electrode column, the receiver electrode traces routed between the transmitter electrode traces and the receiver electrodes.

6. The input device of claim 1, wherein no ground electrode is present between the transmitter electrode columns.

7. The input device of claim 1, wherein the first receiver electrode column comprises:
    a first plurality of receiver electrode traces electrically connecting the first group of the receiver electrodes in series.

8. The input device of claim 7, wherein the first receiver electrode column comprises:
a second plurality of receiver electrode traces electrically connecting a second group of the receiver electrodes in series.

9. The input device of claim 8, wherein adjacent receiver electrodes of the first group of the receiver electrodes are separated by receiver electrodes of the second group.

10. The input device of claim 7, wherein the receiver electrode traces electrically connecting the first group of the receiver electrodes are routed between adjacent receiver electrodes.

11. The input device of claim 1 further comprising:
a processing system configured to:
sequentially drive sensing signals on transmitter electrodes disposed in the first transmitter electrode column that is paired with the first receiver electrode column;
receive effects of the sensing signals on the first group of receiver electrodes disposed in the first receiver electrode column; and
receive effects of the sensing signals on the second group of receiver electrodes disposed in the first receiver electrode column, wherein the receiver electrodes of the first and second groups are interleaved.

* * * * *